Aug. 16, 1960 M. A. PROVI 2,949,288
BATHROOM SCALES
Filed July 21, 1955 2 Sheets-Sheet 1
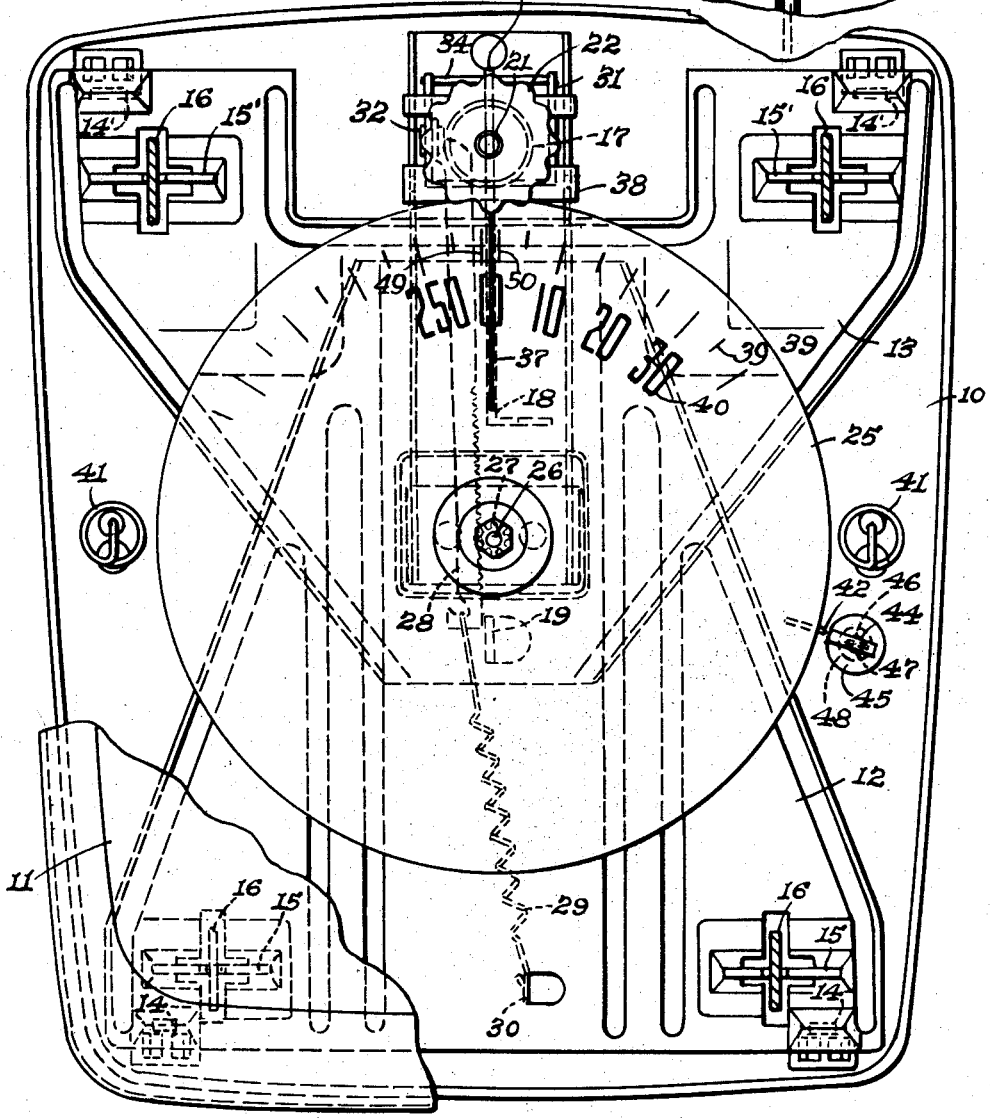
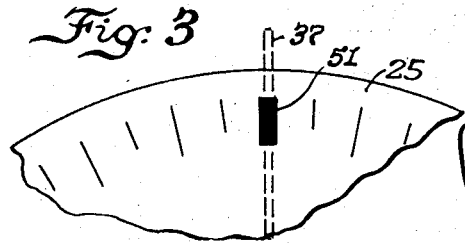
Inventor
Mike A. Provi Aug. 16, 1960    M. A. PROVI    2,949,288
BATHROOM SCALES
Filed July 21, 1955    2 Sheets-Sheet 2

Inventor
Mike A. Provi
Atty

United States Patent Office 2,949,288
Patented Aug. 16, 1960

2,949,288

BATHROOM SCALES

Mike A. Provi, Rockford, Ill., assignor to The Brearley Company, Rockford, Ill., a corporation of Illinois Filed July 21, 1955, Ser. No. 523,519

16 Claims. (Cl. 265—68)

This invention relates to bathroom scales and is more particularly concerned with improvements in the weighing mechanism designed to insure exact return to zero of the weight indicating dial or needle after each and every operation of the scale.

Bathroom scales have been objectionable for a long time because of the dial or the needle not returning to zero, and all scales have had to provide a back-to-zero adjusting nut to correct this when the needle or dial would drift too far from zero on return. Exact return to zero was rarely accomplished, because of the amount of play and friction in the mechanism and the fact that the needle or dial movement represents a multiplication of the lever movement so that the slightest deviation due to play, or friction, or both, (and also wear, of course, was a factor) would mean throwing the scale off noticeably on the zero reading.

It is, therefore, the principal object of my invention to provide on the periphery of the weight indicating dial (which is made of aluminum or other non-magnetic material) a needle of magnetizable material projecting radially and arranged to move into the magnetic field of a permanent magnet when the dial approaches the zero position, whereby to insure returning the dial exactly to zero after each operation of the scale. In the case of a scale having a needle pointer, the tail end of the pointer itself could, of course, be used in a similar way. The magnet is too weak in relation to the pull of the rack return spring to affect in any way the accuracy of weighing, particularly since it is only when the dial arrives at a position close to zero that the projecting needle has any pull exerted on it by the magnet, and this slight pull will do little more than compensate for the friction drag that otherwise prevented the dial from returning to zero. Hence, a far better performing scale is obtained with very little added cost and without complicating the scale construction unnecessarily and also without interfering with the use of the back-to-zero adjusting nut in the usual way, if the dial, due to rough handling or rough usage of the scale should drift too far from zero on return to enable the magnet to attract the needle as intended.

In accordance with another object of my invention, the magnet employed for the return to zero may also, if provided of sufficient width measured circumferentially with respect to the periphery of the weight indicating dial, be employed to obtain results similar to the bathroom scale adjustment of Sutton patent No. 2,405,619. That is to say, the scale, instead of having the usual adjusting nut and screw for return to zero adjustment, may be provided with an adjusting nut and screw having coarse threads so that adjustment of the nut by means of a hand lever through an angle of say only 30° to 45° will take care of the entire range of low to high weight adjustment, and enable the user to alter the weighing of the scale within certain limits to suit himself and cause it to weigh high or low a few pounds in relation to correct weight.

The invention is illustrated in the accompanying drawings, in which—

Fig. 1 is a plan view of a bathroom scale with most of the platform broken away to better disclose the return to zero improvements incorporated in accordance with the present invention;

Figs. 2 and 3 are plan views of the zero portion of the dial showing two preferred zero markings.

Similar reference numerals are applied to corresponding parts in these three views.

Figure 4:
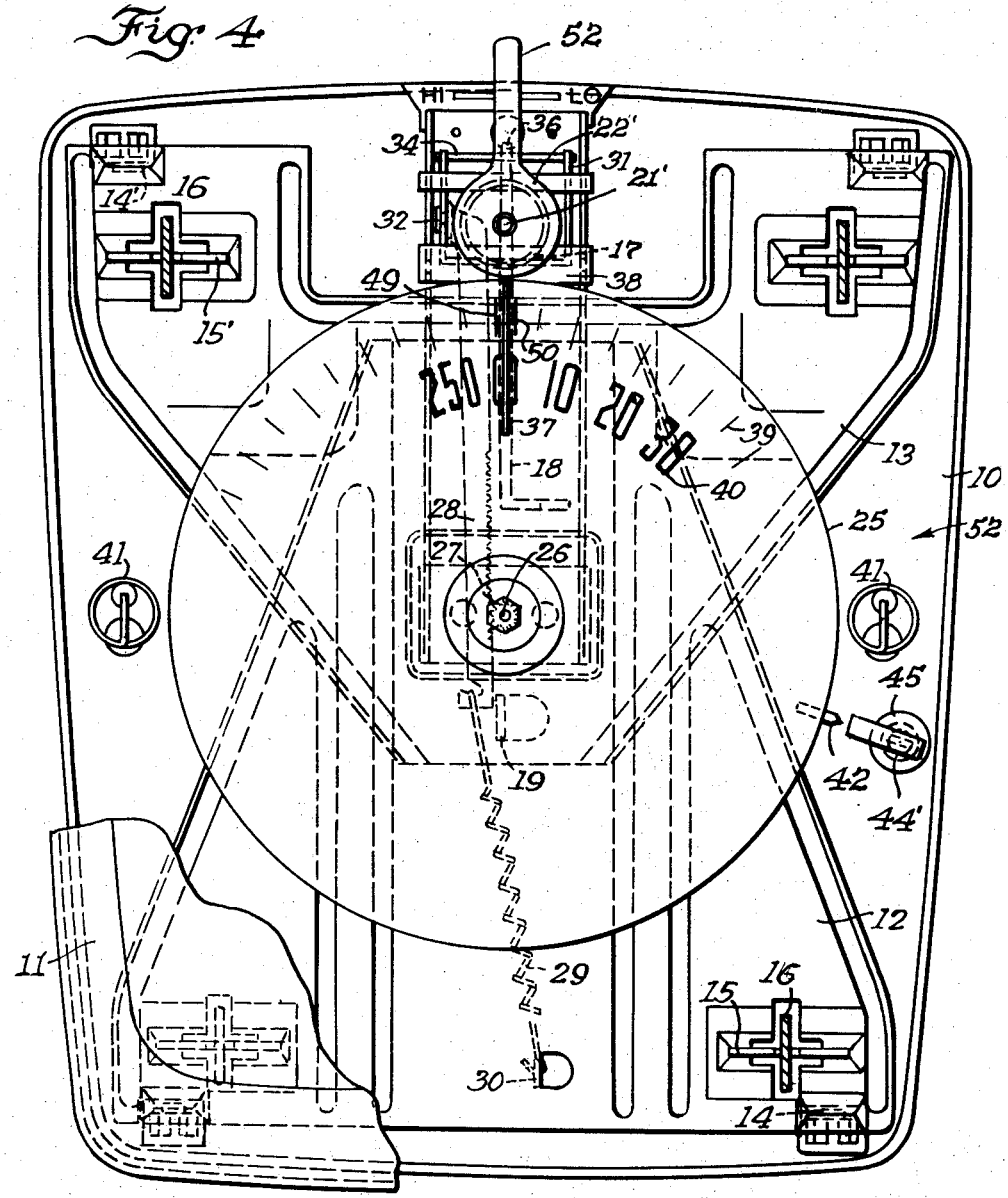
Fig. 4 is a view similar to Fig. 1 showing a modified or alternative construction which in addition to giving the magnetic return to zero permits high-low adjustment.

Referring to the drawings, and first mainly to Fig. 1, the scale illustrated is of the well known type commonly used in bathrooms and comprises a generally rectangular sheet metal base 10 over which a generally rectangular sheet metal platform 11 is supported by means of two levers 12 and 13, which are also preferably made of sheet metal. The lever 12 is supported on the base 10 on a pair of fulcrums 14 and carries a pair of hangers 15 on which rest a pair of downwardly projecting legs 16 for support of the rear end portion of the platform 11. In a similar manner, lever 13 is supported on the base 10 on another pair of fulcrums 14', and carries a pair of hangers 15' on which rest another pair of downwardly projecting legs, like legs 16, for support of the front end portion of the platform 11. A coiled tension spring 17 serves as the weighing spring and is suspended above the front end portion of the base 10 for suspension thereon of the front end portion 18 of the lever 12 to resist downward deflection thereof under the weight imposed thereon when a person stands on the platform 11, as when weighing himself. Weight imposed on the platform 11 is transmitted directly to the lever 12 through legs 16 provided under the rear end portion of the platform, but the weight imposed by the front end portion of the platform 11 on lever 13 is transmitted through said lever to the middle portion of lever 12 at the rear end of the lever 13 where there is a downwardly projecting lug 19 having an arcuate bottom edge resting with minimum friction on lever 12. A screw 21 rigid with the upper end of spring 17 is suspended on a hand-nut 22 accessible for manual adjustment through an opening in a cover plate mounted on top of the platform 11 at the front end thereof, the nut being adjusted one way or the other to adjust the spring up or down in order to set the scale back to zero when and if it gets out of adjustment. It is the downward deflection of the front end portion 18 of the lever 12 against the resistance of spring 17 that is used to cause rotation of the weight indicating dial 25. The dial is carried on a vertical shaft 26 supported for rotation over the central portion of the base 10, and a pinion 27 is provided on the lower end thereof for transmitting rotation thereto. A rack 28 meshes with the pinion and is biased toward the pinion by a light coiled tension spring 29 that is attached at one end to the rear end of the rack and at the other end to a lug 30 struck downwardly from the rear end portion of lever 12. The spring 29, in addition to holding the rack 28 resiliently in engagement with pinion 27, exerts enough pull on the rack 28 to operate the dial 25 whenever the rack 28 is free to move, as when the lever 12 is given downward deflection in a weighing operation, a bell-crank lever 31 pivotally connected at 32 to the front end of the rack 28 being then allowed to oscillate from its zero position through an angle the size of which is proportionate to the amount of downward deflection of the lever 12 so as to cause rotation of the dial 25 through a proportionate angularity and thereby indicate the weight of the person standing on the platform. The bell crank lever 31 is pivoted on a horizontal axis with respect to the base 10 and carries a horizontally extending pin 34 bearing very lightly and with sliding line contact against the flat top surface on an upwardly projecting finger 36 provided on the front end portion 18 of lever 12. Hence, when lever 12 is deflected downwardly, the finger 36 moves downwardly away from pin 34, and bell-crank lever 31, being then free to swing, swings in one direction under the action of spring 29. There is, therefore, only the light spring pressure of spring 29 effective in the operation of the dial so that the dial operation is shockless and no damage can be done to this more or less delicate part of the mechanism if a person jumps on the scale or is otherwise too rough in the handling and operation thereof. The weight reading indicated on the dial 25 can be viewed by the person standing on the platform 11 by looking down through a magnifying lens, which is suitably clamped in place on the front end portion of the platform 11 over a window opening in the front end portion of the platform 11. An index or hairline wire 37 is fixed to the support 38 on the base 10 in radial relationship to and disposed in closely spaced parallel relationship to the top of dial 25 to enable accurate reading of the indicated weight by reference to the weight graduation lines 39 and numerals 40 that are placed in close proximity thereto. In passing, attention is called to two coiled tension springs indicated at 41 in Fig. 1. These are suitably attached at their upper ends to the underside of the platform 11 and are stretched to place the same under a predetermined tension and are hooked onto the base 10 in order to tie the base and platform together resiliently and thereby keep the scale parts in assembled relation, so that one may pick up and carry the scale from one place to another without danger of having the scale come apart. These springs also insure maintenance of the levers 12 and 13 in the correct relationship to their fulcrums 14 and 14' at all times and maintenance of the hangers 15 and 15' in proper relationship at all times to levers 12 and 13, respectively, as well as maintenance of the downwardly projecting legs 16 on the platform in proper engagement with the hangers 15 and 15'.

In accordance with my invention, a metallic needle 42 of magnetized material is suitably secured to and projects radially from the peripheral portion of dial 25 at any convenient point circumferentially spaced from the zero line 43, the needle 42 being herein illustrated as disposed a little more than 90° away from the zero mark. This needle, in the return of the dial 25 to the vicinity of zero position, comes into the magnetic field of a permanent magnet 44, which is of elongated bar form disposed radially with respect to and spaced outwardly from the periphery of the dial in the same horizontal plane with the needle 42 and close enough to the outer end of the needle to exert a predetermined pull on it sufficient to bring the dial exactly to the zero position in the event the dial would otherwise have a tendency to come to a stop to one side or the other of the zero position directly beneath the index wire 37. The performance of the scale is therefore much improved without in any way affecting the accuracy of weighing and without complicating the scale construction and adding too much to the cost of its production. The reason there is no effect upon the accuracy of weighing is that the magnetic field of the small bar magnet 44, to begin with, is too weak in relation to the spring 29 and in relation to the small mechanical advantage which the magnet has by reason of its disposition relative to the needle on the peripheral portion of the dial to make any difference, and, furthermore, the magnet does not come into play except when the dial is fairly near to its zero position. In other words, the magnet is designed to exert only enough pull to slightly more than compensate for the friction drag in the scale mechanism that would otherwise interfere with the dial returning exactly to the zero position. Many purchasers of scales, not aware that the slight deviation of the dial one way or the other from a zero position does not necessarily mean that the scale is not weighing accurately, were prone to adjust and re-adjust the nut 22 far more than the scale manufacturer ever intended should be necessary, and a certain percentage of purchasers doubtlessly have discarded scales on that account, not knowing that the scales were still weighing reasonably accurately. Another percentage of scale purchasers were inclined to take scales back to retailers because of this criticism that the dial in the scale did not always return to zero after each weighing operation, and a certain percentage of retailers would in turn pass these criticisms on to the scale manufacturers, if they did not in fact return the scales and ask for a refund. Hence, it is clear that the present improvement fills a long felt need. In passing, it will be noticed that the bar magnet 44 is rotatably adjustable, the same being mounted in the upper end of a cylindrical support 45 that may be made of brass or other non-magnetizable material having a reduced cylindrical lower end portion 46 rotatably received in a hole 47 provided in the base 10, the protruding end portion of the reduced portion 46 being suitably upset and diametrically slotted, like a screw head, for easy adjustment with a screw driver, as indicated at 48, to fasten the support 45 permanently but rotatably adjustably in place on the base 10.

In operation, when the scale is being assembled at the factory, the support 45 is turned with a screw driver to a position about 90° from that shown, in order that the scale may be tested for accuracy of weighing and adjusted to weigh accurately. Then, when that has been taken care of, the support 45 may be turned to dispose the magnet 44 in the operative position shown in Fig. 1, radially aligned with needle 42. Thereafter, upon each and every operation of the scale, as soon as the dial 25 returns to near the zero position the needle 42 coming into the magnetic field of the magnet 44 has just enough pull exerted on it to insure exact positioning of the dial with its zero line 43 directly under and in the same vertical plane with the index wire 37. The two shorter radial lines 49 and 50 (Fig. 2) disposed in equally spaced relation on opposite sides of the zero line 43 should always appear in the same spaced relation to opposite sides of the index wire 37 when the user sights on a vertical line at the wire 37 with the dial in the zero position. It is only after the scale has been given rough usage or rough handling that the dial 25 might not return to zero, due to the needle 42 under such circumstances remaining too far removed from the magnetic field of the magnet 44 for the magnet return to zero to occur. Under such circumstances, the scale would, of course, not weigh accurately and the nut 22 should then be adjusted to bring the dial back to zero. Over-adjustment or under-adjustment is easily determined by observing how far it is necessary to turn the nut 22 first one way and then the other to cause the dial 25 to shift from zero to the same given extent, using the lines 49 and 50 for reference, and then if the nut 22 is adjusted half way between those two extremes the correct zero adjustment is obtained for closest accuracy in weighing.

In lieu of the zero line 43 and the left and right lines 49 and 50, a single thick zero line 51 may be provided, as shown in Fig. 3, the width of which in relation to the diameter of the index wire 37 will afford substantially the same advantages and operating characteristics as the zero markings shown in Fig. 2.

The scale indicated generally by the reference numeral 52 in Fig. 4 is the same as the scale shown in Fig. 1 in all respects except in regard to the magnetic return to zero and the manual adjustment back to zero. Hence, all of the other corresponding parts have been numbered alike. The screw 21' fixed to the upper end of spring 17 has a much coarser thread than the screw 21 in Fig. 1 and is suspended on a hand nut 22' which has a radially extending handle 52 for manipulation thereof, this nut 22' having, of course, a mating coarse thread so that when the nut is adjusted one way or the other through a small angle the upper end of the spring is adjusted appreciably up or down, and hence only a very slight movement of the handle 52 one way or the other is sufficient to set the scale back to zero if the scale should require such adjustment. However, when a wider bar magnet 44' is employed it is unlikely that the scale should ever require adjustment of handle 52 to return the scale to zero, inasmuch as such a situation would only arise if the scale was dropped or was given other extremely rough handling, to the extent that the needle 42 upon return of the dial 25 after a weighing operation would remain so far away from the magnet 44' as not to have sufficient pull exerted on it to return the dial to the zero point. Hence, it should be clear that, assuming the scale has been adjusted properly at the factory to weigh accurately with the handle 52 in the mid-position shown, one may, without losing the benefit of the magnetic return to zero, affect the scale's accuracy by moving the handle 52 to the right to make the scale indicate a lower weight, and vice versa by movement of the handle 52 to the left. In other words, the needle 42, due to the wider face of bar magnet 44' and consequently its magnetic field of increased width measured in the direction of movement of this magnetizable element, will return the dial 25 to zero after each operation of the scale, but if the handle 52 is moved toward the low point marked "LO" the indicated weight will be lower than the actual weight because the dial is really starting from below the zero point, and vice versa if handle 52 is moved toward the high point, marked "HI." A range of anywhere from 30° to 45° total adjustment of handle 52 from LO to HI is equivalent to the adjustment obtained with several full turns of nut 22 in Fig. 1, due to the coarseness of the threads on screw 21' and in nut 22'.

From the foregoing description of Fig. 4, it should be clear that with that construction I obtain substantially the same advantages in so far as return of the weight indicating dial to zero is concerned as with the construction of Fig. 1, but obtain also the high-low weight adjustment feature of Sutton Patent No. 2,405,619 without complicating the construction of the scale and adding materially to its cost of production. The wider bar magnet 44' is mounted for rotary adjustment to an out-of-the-way position on a support 45, similarly as bar magnet 44 in Fig. 1.

It is believed the foregoing description conveys a good understanding of the objects and advantages of my invention. The appended claims have been drawn to cover all legitimate modifications and adaptations.

I claim:

1. In a weighing scale comprising a base, a platform, weighing mechanism yieldably supporting said platform on said base, and weight indicating means operatively connected with said weighing mechanism to turn from a zero position through an angle proportionate to the weight to be indicated, the improvement which consists in the provision of a single magnetizable element movable with the weight indicating means in the operation thereof providing a single effective magnetic pole, and a single magnet independent of the weighing mechanism supported in fixed relationship to said base adjacent the path of movement of said magnetizable element and arranged to exert an effective pull laterally on said single magnetic pole upon return of the weight indicating means approximately to zero position so as to cause zero positioning thereof.

2. A weighing scale as set forth in claim 1 wherein said weighing mechanism includes a manually operable high-low adjustment the operation of which in the absence of the magnet would cause the weight indicating means to return to a position on one side of zero with a low adjustment and indicate lower than correct weight in weighing operations, and vice versa, said magnet having a wide field measured in the direction of movement of said magnetizable element, whereby to return said weight indicating means to zero position regardless of appreciable high or low adjustment of said manually operable high-low adjustment.

3. A weighing scale as set forth in claim 1, wherein both the magnet and the magnetizable element are elongated and provide cooperating end portions, and the magnet is arranged in substantially the same plane with respect to and aligned with but spaced slightly outwardly from the magnetizable element so that upon the return of the weight indicating means to zero position the magnet and magnetizable element are in end to end alignment so that an endwise pull is exerted effectively on said magnetizable element.

4. In a weighing scale comprising a base, a platform, weighing mechanism yieldably supporting said platform on said base, and weight indicating means operatively connected with said weighing mechanism to turn from a zero position through an angle proportionate to the weight to be indicated, the improvement which consists in the provision of a magnetizable element movable with the weight indicating means in the operation thereof, and a magnet independent of the weighing mechanism supported in fixed relationship to said base adjacent the path of movement of said magnetizable element and arranged to exert an effective pull laterally on said magnetizable element upon return of the weight indicating means approximately to zero position so as to cause zero positioning thereof, said magnet being supported for movement to a retracted position temporarily relative to said magnetizable element to permit adjustments of the scale to be made independently of the magnet.

5. In a bathroom scale, comprising a base, a platform, spring restrained weighing levers yieldably supporting said platform on said base, and a rotary weight indicating element operatively connected with said levers to rotate from a zero position through an angle proportionate to the weight to be indicated, the improvement which consists in the provision of a magnetizable needle movable with and projecting from said weight indicating element, and a magnet independent of the weighing levers supported in fixed relationship to said base adjacent the path of movement of said needle and arranged to exert an effective pull laterally on said needle when said weight indicating element is close to zero position so as to cause zero positioning thereof.

6. A bathroom scale as set forth in claim 5, wherein the magnet is arranged in substantially the same plane with respect to and aligned with but spaced slightly outwardly from the magnetizable needle so that upon return of the weight indicating element to zero position the magnet and magnetizable needle are in end to end alignment so that an endwise pull is exerted effectively on said magnetizable needle.

7. A bathroom scale as set forth in claim 5 including a coarse screw and nut adjustment in connection with the spring of said spring restrained weighing levers permitting high and low weighing adjustment thereof on opposite sides of a correct weighing adjustment, said magnet having a wide field measured in the direction of movement of said needle, whereby to return said weight indicating element ot zero position regardless of appreciable high or low adjustment of said screw and nut adjustment.

8. A bathroom scale as set forth in claim 5 wherein said magnet is supported for movement to a retracted position temporarily relative to said magnetizable element to permit adjustments of the scale to be made independently of the magnet.

9. In a bathroom scale, comprising a base, a platform, spring restrained weighing levers yieldably supporting said platform o nsaid base, and a rotary weight indicating dial operatively connected with said levers to rotate from a zero position through an angle proportionate to the weight to be indicated, the improvement which consists in the provision in a scale wherein the rotary dial is of nonmagnetic material of a magnetized needle movable with and projecting radially from said weight indicating dial, and a magnet independent of the weighing levers supported in fixed relationship to said base adjacent the path of arcuate movement of said needle and arranged radially with respect to said dial to exert an effective pull laterally on said needle when said weight indicating dial is close to zero position so as to cause zero positioning thereof.

10. A bathroom scale as set forth in claim 9, wherein the magnet is arranged in substantially the same plane with respect to and aligned with but spaced slightly outwardly from the magnetized needle so that upon return of the weight indicating dial to zero position the magnet and magnetized needle are in end to end alignment so that an endwise pull is exerted effectively, on said magnetized needle.

11. A bathroom scale as set forth in claim 9 wherein the magnet is of the bar type and is disposed in a horizontal plane, and said dial is disposed in substantially the same horizontal plane with the magnet and the latter is rotatable about a vertical axis so as to move one end of the magnet to a retracted position temporarily relative to said needle to permit adjustments of the scale to be made independently of said magnet.

12. In a weighing scale, the combination with a weighing mechanism, a weight indicator element and a graduated scale element, one of which elements is operatively connected with the weighing mechanism and moves relative to the other in a weighing operation and thereafter returns to a zero position or approximately so, the movable element including a single part that is magnetizable providing a single effective magnetic pole, of a single magnetic means that is independent of the weighing mechanism mechanism and arranged so as to exert no appreciable force on the single magnetic pole in the movement of the magnetizable part in a weighing operation but is operative through the effect of its magnetic field on said single magnetic pole when the magnetizable part approaches the zero position to return said magnetizable part to zero.

13. A weighing scale as set forth in claim 12, wherein both the magnetic means and the magnetizable part are elongated and provide cooperating end portions, and the magnetic means is arranged in substantially the same plane with respect to and aligned with but spaced slightly outwardly from the movable element and magnetizable part movable therewith so that uponreturn of the movable element to zero position the magnetizable part and magnetim means are in dead center relationship to one another so as to maintain the zero position.

14. A weighing scale as set forth in claim 12 and which includes a manually operable high-low adjustment, said magnetic means having a wide field measured in the direction of movement of said movable elements magnetizable part, whereby to return said movable element to zero position regardless of appreciable adjustment either way of said high-low adjustment.

15. In a weighing scale, the combination with a weighing mechanism, a weight indicator element and a graduated scale element, one of which elements is operatively connected with the weighing mechanism and moves relative to the other in a weighing operation and thereafter returns to a zero position or approximately so, the movable element including a part that is magnetizable, of magnetic means that is independent of the weighing mechanism and arranged so as to exert no appreciable force on the magnetizable part of said movable element in its movement in a weighing operation but is operative through the effect of its magnetic field on said magnetizable part when the movable element approaches the zero position to return said movable element to zero, said magnetic means being removable to permit initial adjustments of the scale at the factory independently of said magnetic means.

16. In a weighing scale, the combination with a weighing mechanism, a weight indicator element and a graduated scale element, one of which elements is operatively connected with the weighing mechanism and moves relative to the other in a weighing operation and thereafter returns to a zero position or approximately so, the movable element including a part that is magnetizable, of magnetic means that is independent of the weighing mechanism and arranged so as to exert no appreciable force on the magnetizable part of said movable element in its movement in a weighing operation but is operative through the effect of its magnetic field on said magnetizable part when the movable element approaches the zero position to return said movable element to zero, said magnetic means being shiftable to a retracted position relative to the path of movement of the magnetizable part of said movable element.

References Cited in the file of this patent
UNITED STATES PATENTS

| | | |
|---|---|---|
| 1,623,820 | West | Apr. 5, 1927 |
| 1,818,170 | Stalder | Aug. 11, 1931 |
| 1,841,543 | McKeown | Jan. 19, 1932 |
| 2,350,741 | Ford | June 6, 1944 |
| 2,463,414 | Nelson | Mar. 1, 1949 |
| 2,475,684 | Weckerly | July 12, 1949 |
| 2,766,038 | Weber | Oct. 9, 1956 |